INVENTOR.
E. Elliott Hood
ATTORNEY

Patented Feb. 12, 1946

2,394,690

UNITED STATES PATENT OFFICE 2,394,690

ENGINE STARTER GEARING

Edwin Elliott Hood, Elmira, N. Y., assignor to Bendix Aviation Corporation, South Bend, Ind., a corporation of Delaware Application June 22, 1944, Serial No. 541,525

6 Claims. (Cl. 74—7)

The present invention relates to engine starter gearing and more particularly to a drive of the automatically engaging type which is arranged to maintain the gears meshed until the engine is reliably self-operative.

It is an object of the present invention to provide novel engine starter gearing in which a motor driven pinion is positively held in mesh with an engine gear while being permitted to overrun the starting motor when the engine fires.

It is another object to provide such a device including a yielding connection comprising a block of elastically deformable material.

It is a further object to provide such a device in which the holding means comprises a spring pressed latch and means are provided for releasing the latch when the engine is reliably self-operative.

Another object is to provide such a device in which the latch is so formed that it cannot project unduly or become disengaged from the drive by centrifugal force or other effects.

Further objects and advantages will be apparent from the following description taken in connection with the accompanying drawing in which.

Figure 1:
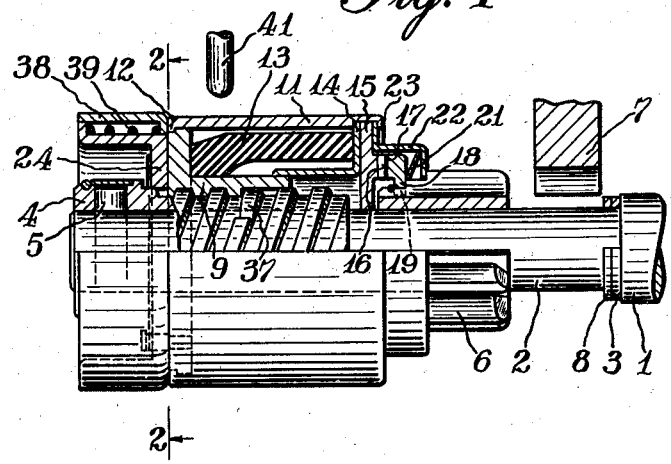
Fig. 1 is a side elevation partly in section of an engine starter drive forming a preferred embodiment of the invention.
Figure 2:
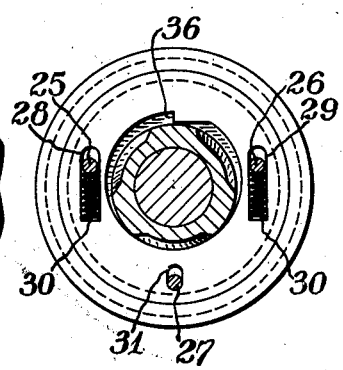
Fig. 2 is a section taken substantially on line 2—2 of Fig. 1.

In Fig. 1 of the drawing there is illustrated a power shaft 1 having a smooth reduced extension 2, a shoulder 3 being formed by the reduction in diameter. A screw shaft 4 is fixed in any suitable manner as by means of a cross-pin 5 on the extension 2 of the power shaft. A pinion 6 is slidably journalled on said extension 2 between the end of the screw shaft and the shoulder 3 for movement into and out of mesh with a member such as a gear 7 of an engine to be started. Preferably, thrust washers 8 are seated against the shoulder 3 to form a stop for the pinion in its meshing position.

A flanged nut 9 is threaded on the screw shaft 4, and means are provided for connecting the nut to the pinion 6 for longitudinal and rotary movement. As here shown this means comprises a barrel member 11 surrounding the nut and having an internal flange 12 preventing egress of the nut from the barrel. A cylindrical block 13 of elastically deformable material such as rubber is seated at one end on the nut 9 within the barrel 11 and at its other end bears against a flanged thimble 14 which cooperates with the nut 9 to form a closed chamber for the rubber block. A driving clutch member 15 is mounted in the open end of the barrel 11 and is provided with teeth 16 adapted to cooperate with teeth 17 of a driven clutch member 18 fixed as indicated at 19 on the pinion 6. Means for yieldably holding the clutch members in engagement are provided in the form of a dished spring member 21 bearing against the driven clutch member 18 and retained by a thimble 22. The thimble 14, driving clutch member 15 and thimble 22 are all retained in the end of the barrel 11 in any suitable manner as by spinning over the end of the barrel as indicated at 23. The thimble 14 is preferably connected positively with the driving clutch member 15 by brazing or welding or in any other suitable manner.

Means are provided for holding the pinion 6 in mesh with the engine gear 7 until the actuation of a releasing means by the operator. As here shown this is accomplished by means of an annular latch member 24 which is slidably mounted on the flange of the nut 9, being retained thereon by means of rivets or studs 25, 26, 27 fixed in the nut and traversing parallel with slots 28, 29 and 31, in the latch member.

Means for urging the latch eccentrically into engagement with the screw shaft are provided in the form of springs 30 located in slots 28, 29 bearing against the rivets 25, 26. Retaining means for the latch is provided in the form of a locking ring 32 having slots 33, 34 and 35 for receiving the studs 25, 26 and 27 and being sufficiently flexible to be snapped under the heads of said rivets.

The latching member 24 is provided interiorly with a shoulder 36, arranged to engage in a recess 37 in the screw shaft by eccentric movement of the latch member when in registry therewith. The recess 37 is so located that when the latch engages therewith, the pinion is prevented from moving back toward idle position more than the distance necessary to release the clutch members 15, 18.

A sleeve 38 is mounted telescopically on the latch ring 24 and is pressed against the end of the barrel 11 by means of a spring 39. The sleeve 38 has a diameter at least as great as the barrel 11 so that when the latch has moved eccentrically to engage the screw shaft, the sleeve 38 projects to that extent beyond the surface of the barrel.

A trip member 41 is mounted adjacent the position assumed by the sleeve 38 when the pinion 6 is meshed with the engine gear. The trip is arranged to be slidable radially into engagement with the sleeve 38 under the control of the operator whereby the sleeve, and consequently the latch 24 may be moved into concentric relation with the drive thus releasing the latch and permitting the pinion to return to idle position. The trip 41 may be actuated manually by the operator or may be actuated automatically in the manner shown in the patent to Kearney 2,339,486.

Figure 3:
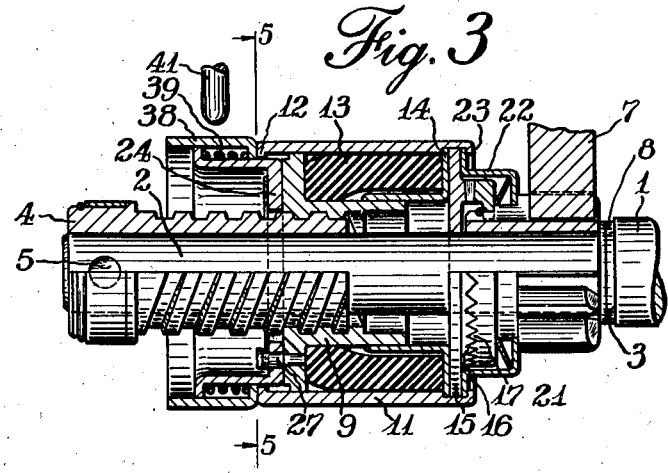
Fig. 3 is a view similar to Fig. 1 showing the parts in cranking position.
Figure 4:
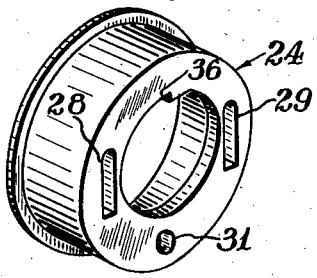
Fig. 4 is a detail in perspective of the annular latch member.
Figure 5:
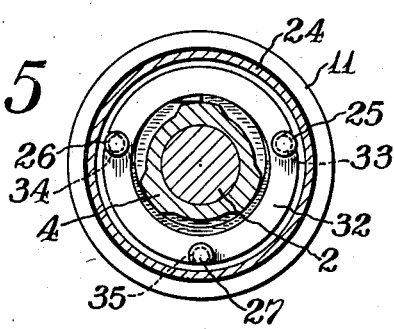
Fig. 5 is a section taken substantially on line 5—5 of Fig. 3.

In operation, starting with the parts in the positions illustrated in Fig. 1 energization of the armature shaft causes the nut 9, barrel 11 and pinion 6 with their associated parts to be moved to the right until the pinion meshes with the engine gear 7, the meshing position being defined by engagement of the pinion with the thrust washers 8. Further movement of the nut is resisted by the rubber block 13 which transmits its pressure and torque to the pinion 6 through the clutch members 15, 18, such transmission being cushioned by the resiliency of the rubber. By the time sufficient torque has been built up to start rotation of the engine, the nut 9 has advanced within the barrel to the position illustrated in Fig. 3 carrying with it the latch member 24, which movement is permitted by compression of the spring 39.

When the engine fires, the torque on the drive is relieved, thus permitting the nut to be moved back to the end of the barrel by the expansion of the rubber block 13. At this time, the shoulder 36 of the latch is moved into engagement with the recess 37 in the screw shaft by the action of the springs 30. After the nut 9 has moved toward idle position sufficiently to release clutch members 15, 18 further backward movement is prevented by the latch, so that the pinion is retained in mesh with the engine gear while being permitted to overrun freely by disconnection of the clutch members. If the engine fails to continue operative, cranking is immediately resumed as soon as the speed of the starting motor equals that of the pinion. When the engine has become reliably self-operative the starting motor which actuates the power shaft 1 is deenergized by the operator and trip 41 is advanced into engagement with the sleeve 38 which is thus brought into concentricity with the drive, releasing the engagement of the latch 24 with the screw shaft 4. The nut is then free to overrun the screw shaft and consequently return to idle position, drawing the pinion out of mesh with the engine gear.

Although but one embodiment of the invention has been shown and described in detail, it will be understood that other embodiments are possible and various changes may be made in the form and arrangement of the parts without departing from the spirit of the invention as defined in the claims appended hereto.

What is claimed is:

1. In an engine starter drive a power shaft, a screw shaft fixed thereon, a pinion slidably journalled on the power shaft for movement into and out of mesh with a gear of an engine to be started, a nut on the screw shaft, means including an over-running clutch connecting the nut to the pinion for rotation and longitudinal movement therewith, a circular latch surrounding the screw shaft and cooperating therewith when moved eccentrically thereto to hold the pinion in mesh, and means for moving the latch co-axially with the screw shaft to release the pinion and permit it to return to idle position.

2. An engine starter drive as set forth in claim 1 in which the means for connecting the nut to the pinion includes a barrel member, and the means for moving the latch includes a sleeve in telescopic relation to the latch and having an outside diameter at least as great as that of the barrel.

3. In an engine starter drive a screw shaft, a nut threaded thereon, a pinion connected therewith for longitudinal movement into and out of mesh with a gear of an engine to be started and for rotary movement to drive the engine gear, an annular latch member loosely surrounding the screw shaft and connected to rotate with the nut, said latch member and screw shaft having means adapted to cooperate upon eccentric movement of the latch member to prevent movement of the nut in a direction to de-mesh the pinion and yielding means urging the latch member into its eccentric locking position, and releasing means for moving the latch member into concentric relation with the screw shaft to disconnect the latch.

4. An engine starter drive as set forth in claim 3 in which the releasing means includes a sleeve in telescopic relation with the latch member, and a trip member adapted to engage the sleeve during rotation thereof and move it into concentricity with the screw shaft.

5. In an engine starter drive, a power shaft having a fixed abutment thereon, a screw shaft fixed on the power shaft, a nut threaded on the screw shaft, a pinion journalled on the power shaft and slidable thereon into engagement with said abutment, means for connecting the nut and pinion including a block of elastically deformable material and a barrel member surrounding the nut and block, a circular latch member surrounding the screw shaft slidably mounted on the nut, means normally urging the latch member eccentrically to engage the screw shaft and hold the pinion in mesh, and means for centering the latch member to release the pinion.

6. An engine starter drive as set forth in claim 5 in which the releasing means includes a sleeve in telescopic relation to the latch member having a diameter at least as great as that of the barrel, and yielding means for holding the sleeve against the end of the barrel.

E. ELLIOTT HOOD.